United States Patent

[11] 3,582,003

| [72] | Inventor | Theodore A. Langstroth<br>5959 Rhode Island Ave., Cincinnati, Ohio 45237 |
|---|---|---|
| [21] | Appl. No. | 841,116 |
| [22] | Filed | July 11, 1969 |
| [45] | Patented | June 1, 1971<br>Continuation-in-part of application Ser. No. 615,881, Feb. 14, 1967, now abandoned. |

[54] PROCESS FOR COMMINUTING CYANIME CHLORIDE CRYSTALS
3 Claims, No Drawings

[52] U.S. Cl. .................................................. 241/16,
241/30, 252/311, 252/314
[51] Int. Cl. ....................................................... B02c 1/00,
B04b 15/04
[50] Field of Search .......................................... 241/27,
172, 30C, 16; 51/309; 260/248C; 23/15; 106/308;
252/314; 260/240B

[56] References Cited
UNITED STATES PATENTS

| 3,149,789 | 9/1964 | Szegvari ...................... | 241/172X |
| 3,337,140 | 8/1967 | Wahl ............................ | 241/30X |
| 3,376,302 | 4/1968 | Graver ........................ | 260/240X |

FOREIGN PATENTS

| 976,822 | 12/1964 | Great Britain................ | 260/240 |

*Primary Examiner*—Richard D. Lovering
*Attorneys*—Elmer J. Lawson, B. Woodrow Wyatt, Thomas L. Johnson, Robert K. Bair, William G. Webb and Roger T. Wolfe

ABSTRACT: Cyanuric chloride crystals are ground by attritive action of zirconium oxide beads suspended in a liquid medium in a rotating-agitator attrition apparatus to produce a suspension of finely comminuted cyanuric chloride in liquid medium useful in chemical syntheses.

PROCESS FOR COMMINUTING CYANIME CHLORIDE CRYSTALS

This application is a continuation-in-part of my prior copending U.S. Pat. application Ser. No. 615,881, filed Feb. 14, 1967, now abandoned.

This invention relates to the comminution of solid material. More particularly, it relates to improvements in a method for grinding the commercial organic chemical product cyanuric chloride.

Cyanuric chloride, also called 2, 4, 6-trichlor-s-triazine, is a well-known chemical intermediate useful in preparing many of the commercial triazinylstilbene-type optical brightening agents, reactive-type dyes, and herbicides. It is known as a highly reactive material comparable in chemical properties to the acyl chlorides. As an article of commerce, cyanuric chloride is ordinarily supplied in the form of rather large crystals of about 50 to 200 microns in diameter. The relatively small ratio of surface area to weight of this form of the compound considerably lessens its tendency to hydrolyze, and thus it can more easily be supplied in pure form. However, in the large-crystal commercial form, cyanuric chloride is not very reactive; therefore for use as a chemical reactant, it is ordinarily dissolved in a suitable solvent or is first converted to a very finely divided form. The common solvents for cyanuric chloride such as ether, benzene, acetone, toluene, dioxane, and the like are both expensive and dangerous to employ in the large quantities required for chemical syntheses on a commercial scale, and the presence of these solvents sometimes causes undesired side reactions, affecting the yield and quality of the final product. Accordingly, cyanuric chloride is commonly employed in very finely divided solid form as a reactant in the manufacture of optical brightening agents. Thus, in the conventionally employed procedure, the cyanuric chloride is dissolved in acetone and precipitated rapidly with a large quantity of ice and water in order to produce very fine crystals which are highly reactive. The use of the aqueous-acetone mixtures instead of acetone solutions diminishes but does not eliminate the fire hazard, and moreover the acetone cannot be recovered economically from the aqueous mixture, and the presence of the acetone under certain conditions causes side reactions in the synthesis.

Attempts to eliminate the use of organic solvents by resort to purely mechanical methods for reducing the size of commercial cyanuric chloride crystals have been notably unsuccessful, primarily because of the extreme hardness of the crystals. For instance, milling the cyanuric chloride crystals with quartz sand at high speed in water has proven to be ineffective for reducing their size, possibly because of the low density of the sand. When cyanuric chloride crystals are milled to water at high speed in the presence of steel shot, the latter is eroded and an undesirable brown color is imparted to the product. It is also very difficult to free the thus ground cyanuric chloride from the steel shot. Dry mechanical grinding methods for reducing the crystalline size in such equipment as a ball mill or a pulverizer are difficult at best because of toxicity of the dust produced, reactivity of cyanuric chloride with moisture in the air, problems of temperature control, and inefficient grinding.

In its process aspect, the present invention resides in a process for preparing finely divided particles of cyanuric chloride in a liquid medium by comminuting relatively large cyanuric chloride crystals. In its composition aspect, the invention resides in an article of manufacture comprising finely comminuted cyanuric chloride suspended in a liquid medium, as produced by said process.

In accordance with the process aspect of the present invention, I have found that cyanuric chloride crystals are effectively and efficiently reduced to finely divided particle form by comminuting the cyanuric chloride crystals in a rotating-agitator type attrition apparatus containing a multiplicity of spheroidal attritive elements suspended in a liquid medium, said attritive elements consisting of beads of stabilized zirconium oxide in the size range about 5 to about 30 mesh. By the term finely divided particle form I mean that the particles are sufficiently small to allow the cyanuric chloride to be reactive with basic reagents in aqueous medium. For this purpose the particles should be less than 6 microns in diameter, and preferably they should average less than 2 microns in diameter.

The rotating-agitator type attrition apparatus comprises a stationary vessel with rotating-agitator means for moving through and impelling the zirconium oxide attritive grinding elements. I have found that a preferred agitator comprises a central shaft bearing a plurality of crossbars or blades, distributed evenly throughout the submerged length of the shaft, which crossbars or blades transfer high kinetic energy to the attritive elements. The apparatus optionally can be provided with a cooling jacket for circulating around the stationary vessel during the comminuting process a cooling liquid, for example, ice water or brine solution. This is particularly desirable when the liquid medium employed in the process is reactive with cyanuric chloride at higher temperatures, because the friction developed during the comminuting process produces a considerable amount of heat. The rotating agitator is driven by any suitable means such as an electric motor.

The speed of rotation of the agitator is preferably in the range 300 to 1,200 r.p.m. For continuous operations, high-speed rotation appears to be preferable, but for batch processes, the lower range of speeds is effective. In general, the longer time the cyanuric chloride is in contact with the attritive elements, the slower the agitator can be run to accomplish the same end result.

The attritive elements which comprise an essential feature of my invention are spheroidal beads of stabilized zirconium oxide, which has high hardness, high abrasion resistance, and high density. The combination of these properties appears to make zirconium oxide uniquely adaptable for grinding cyanuric chloride crystals, for I have found that by their use cyanuric chloride crystals are rapidly comminuted, ad the zirconium oxide beads are abraded to only a negligible degree. Finely divided cyanuric chloride prepared by this process is therefore substantially free of any color and contamination imparted by the grinding operation. I ordinarily prefer zirconium oxide beads of about 10 to 20 mesh which are available commercially from the Zirconium Corporation of America under the name "Zircoa 1304 Beads" however, zirconium oxide beads in the range 5 to 30 mesh, that is, approximately 4 mm. to 0.6 mm. in diameter are suitable for the purpose of my invention, because they impart a relatively uniform size to the resulting finely divided cyanuric cyanuric chloride. In order to ensure efficient grinding action the stationary vessel is preferably charged with zirconium oxide beads to the extent of between three-fourths and nine-tenths its capacity.

In order to give added lubricity and buoyancy to the attritive elements, I suspend the attritive elements and the charge of cyanuric chloride in a liquid medium. The nature of the liquid medium is not critical, except that it must be inert to the highly reactive cyanuric chloride at the temperature at which the process is conducted, and it must not be a solvent for cyanuric chloride. I have found that water works well as a suspending medium if it is kept at or below about 10° C., and thus I have employed a cooling jacket around the stationary vessel circulating a cold brine solution to maintain a temperature in the range about 0° C. to about 10° C. A weight of water in the range of three to five times the weight of cyanuric chloride is sufficient to provide good lubricity and buoyancy to the zirconium oxide beads. I generally use an amount of water by weight approximately four times the weight of cyanuric chloride.

My process is adapted to comminuting crystals of cyanuric chloride either batchwise or continuously For batch processes the stationary vessel can be a simple upright cylinder with or without a cooling jacket as described above. The length of time required to comminute cyanuric chloride in accordance with the batchwise aspect of my process depends upon the original size of the cyanuric chloride crystals, the rotation speed of the agitator, and to a certain extent, the size of the stationary vessel. In general, the time required ranges from about 5 minutes to about 30 minutes when the agitator is run at speeds in the range 600 to 300 r.p.m., respectively.

For continuous processes, apparatus of the type described in U.S. Pat. No. 3,149,789 is well adapted. In said apparatus, crystalline cyanuric chloride and the liquid medium are continuously added to one end of the cylindrical vessel containing zirconium oxide attritive elements kept in rapid motion by the agitator, and finely divided cyanuric chloride and liquid are continuously removed at the other end of the vessel. Screens of the proper mesh size situated in front of the inlet and outlet orifices confine the zirconium oxide attritive elements to the vessel, but allow passage of liquid and cyanuric chloride. The rate of comminuting cyanuric chloride in accordance with the continuous aspect of my process depends upon the rotation speed of the agitator and the size of the stationary vessel. In a 10-gallon vessel, approximately 20 pounds of slurry consisting of 25 percent ground cyanuric chloride in water can be produced per minute when the agitator is run at 600 r.p.m. A proportionately higher rate is achieved with greater agitation, and a lower rate with slower agitation. In general, the rate is also proportional to the size of the stationary vessel. Thus, in a 20-gallon vessel, approximately 40 pounds of the above-mentioned slurry can be produced.

My invention is further illustrated by the following examples, but is not to be construed as limited thereto.

EXAMPLE I

Batchwise Process

A 9.5-liter capacity attrition apparatus, having an agitator fitted with bars extending horizontally on a shaft driven by an electric motor, and fitted with a cooling jacket in which was circulated cold brine solution at about −10° C., was charged to about three-quarters of its capacity with 10—20 mesh zirconium oxide beads (Zircoa 1304, Zirconium Corporation of America, Solon, Ohio). There was then added a slurry of 309 g. of white, crystalline cyanuric chloride (approximately 50-—200 microns in diameter) in 1,500 ml., of cold water and 10 ml. of nonyl phenyl polyethylene glycol ether surfactant and a few drops of octyl alcohol to prevent foaming. The agitator was run at 600 r.p.m. for 7 minutes during which time the temperature of the aqueous slurry rose from 4° C. to 7° C. The resulting fine suspension of cyanuric chloride, which did not settle on standing, was washed free from the zirconium oxide beads with water. The resulting suspension was examined under a microscope and the particles were found to be less than 5 microns and to average about 2 microns in diameter. The product was pure white and contained substantially no fragments of zirconium oxide.

When this experiment was repeated in the manner described above with the exception that the rotating agitator was run at 300 r.p.m., equivalent comminution of the cyanuric chloride crystals was obtained after about 30 minutes. Considerably less heat was generated when the process was run at the slower speed

EXAMPLE II

Continuous Process

Attrition apparatus substantially as described in U.S. Pat. No. 3,149,789 and having a capacity of approximately 40 liters was used. The vessel was charged to approximately nine-tenths its capacity with zirconium oxide beads as described in example I, and the agitator was rotated at about 600 r.p.m. A slurry containing white crystals of commercial cyanuric chloride (approximately 50 to 200 microns in diameter) in four times its weight of cold water was fed continuously from an inlet in the bottom of the vessel, and the contents were maintained at 7° C. or below by circulating brine solution at −10° C. through a cooling jacket. Finely divided cyanuric chloride and water were withdrawn from an outlet at the top of the vessel, which outlet was covered by a screen of such mesh as to allow the ground cyanuric chloride to pass, but to retain the zirconium oxide beads and unground cyanuric chloride. From this apparatus, finely divided cyanuric chloride of average crystal size in the range 2 to 4 microns was obtained at the rate of about 240 pounds per hour. The cyanuric chloride obtained by this comminution process was slightly more reactive with basic reagents in aqueous suspension than was finely divided cyanuric chloride obtained by precipitation of an acetone solution of cyanuric chloride in a large excess of cold water.

In comparison experiments, comminution of cyanuric chloride crystals in a "sand mill" as described in U.S. Pat. No. 2,581,414, was attempted, but was completely unsuccessful in that the sand did not grind the crystals even at speeds of 1,700 r.p.m. Steel balls having a diameter of one-sixteenth inch were used in grinding cyanuric chloride crystals in a "sand mill," but the brown coloration due to iron contamination made the product unsuitable for use in preparing optical bleaching agents. In addition, the disc agitators in a "sand mill" were not as efficient as blades or crossbars for imparting high kinetic energy to the grinding media for grinding cyanuric chloride.

Steel balls in the apparatus described in examples I and II successfully comminuted cyanuric chloride crystals, but attrition of the steel imparted an unacceptable brown color to the product.

I claim:

1. The improvement in a method of preparing finely divided particles of cyanuric chloride suspended in aqueous medium which comprises comminuting cyanuric chloride crystals in a rotating-agitator type attrition apparatus containing a multiplicity of relatively spheroidal attritive elements suspended in an aqueous medium, said attritive elements consisting of beads of stabilized zirconium oxide.

2. The method according to claim 1 wherein the comminution is conducted in a continuous process.

3. The method according to claim 1 wherein the comminution is conducted in a batchwise process.

UNITED STATES PATENT OFFICE
CERTIFICATE OF CORRECTION

Patent No. 3,582,003      Dated June 1, 1971

Inventor(s) Theodore A. Langstroth

It is certified that error appears in the above-identified patent and that said Letters Patent are hereby corrected as shown below:

Title Page and Column 1, title should read -- PROCESS FOR COMMINUTING CYANURIC CHLORIDE CRYSTALS --. Title Page, Assignment data should be indicated -- [73] Assignee Sterling Drug Inc. New York, N.Y. --. Column 1, line 50, "milled to water" should read -- milled in water --. Column 2, line 23, "operations" should read -- operation --; line 35, "ad" should read -- and --; line 46, "cyanuric cyanuric chloride" should read -- cyanuric chloride --; and, line 68, "continuously For" should read -- continuously. For --.

Signed and sealed this 13th day of June 1972.

(SEAL)
Attest:

EDWARD M. FLETCHER, JR.
Attesting Officer

ROBERT GOTTSCHALK
Commissioner of Patents